United States Patent [19]
Cross et al.

[11] Patent Number: 5,172,887
[45] Date of Patent: Dec. 22, 1992

[54] FLUID CONTROL VALVE

[75] Inventors: Robert K. Cross, Surrey; Ronald Phillips; Lukhbir S. Panesar, both of Middlesex, all of England

[73] Assignee: Lucas Industries Public Limited Company, Solihull, England

[21] Appl. No.: 719,399

[22] Filed: Jun. 24, 1991

[51] Int. Cl.$^5$ .................................. F16K 31/06
[52] U.S. Cl. ............................ 251/129.19; 251/129.02
[58] Field of Search ............... 251/77, 80, 129.02, 251/129.19

[56] References Cited

U.S. PATENT DOCUMENTS

| | | | |
|---|---|---|---|
| 3,632,081 | 1/1972 | Evans | 281/129.19 |
| 4,666,125 | 5/1987 | Marts et al. | 281/129.19 |
| 4,717,118 | 1/1988 | Potter | 281/129.19 |
| 4,869,462 | 9/1989 | Logie et al. | 281/129.19 X |
| 4,957,275 | 9/1990 | Homes | 281/129.19 |

Primary Examiner—Gerald A. Michalsky
Attorney, Agent, or Firm—Dvorak and Traub

[57] ABSTRACT

A fluid control valve includes a valve member movable into engagement with a seating to prevent the flow of fluid through the valve, and an actuating member which is biased in one direction by a return spring and is moved against the action of the return spring by the armature of the actuator when the winding thereof is energized. The movement of the actuating element is transmitted to the valve member through an under travel spring which yields to allow continued movement of the actuating element when the valve member engages the seating.

8 Claims, 2 Drawing Sheets

FLUID CONTROL VALVE

This invention relates to an electromagnetically operable fluid control valve of the ON/OFF type comprising a valve member movable between open and closed positions relative to a seating, an electromagnetic device including a stator assembly carrying a winding and an armature which is moved towards the stator assembly when the winding is energised, a return spring which is stressed during movement of the armature towards the stator assembly, and means coupling the armature to the valve member.

The object of the invention is to provide a control valve of the kind specified in a simple and convenient form.

According to the invention in a control valve of the kind specified said means comprises an actuating element engaged by said return spring and a valve member under travel spring interposed between said actuating element and the valve member and which yields to allow continued movement of the actuating element when the valve member engages the seating.

Figure 1:
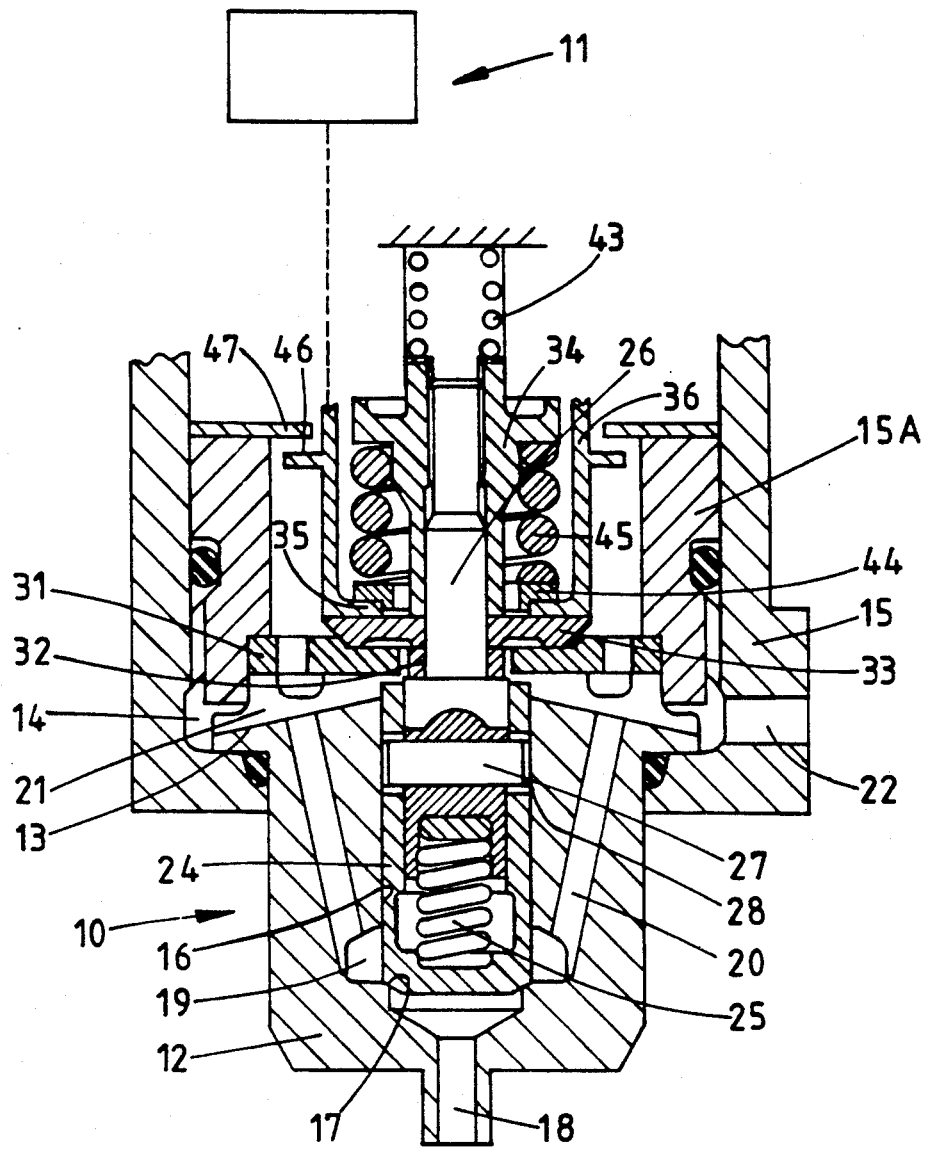
Figure 2:
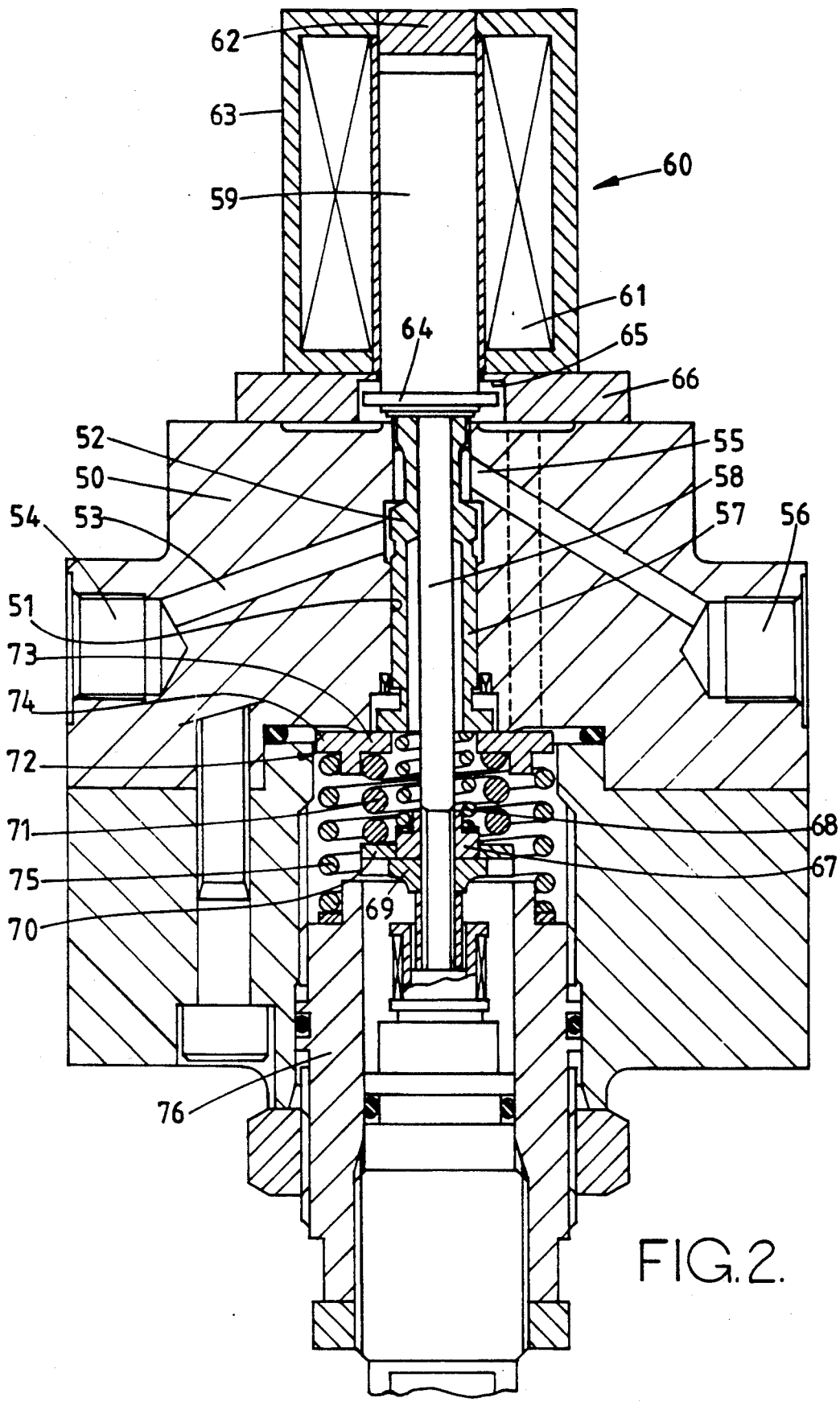

Two examples of valve in accordance with the invention will now be described with reference to the accompanying drawings in which:

FIG. 1 is a part sectional side elevation of the first example of the valve, and FIG. 2 is a view similar to FIG. 1 of the second example of the valve.

Referring to FIG. 1 of the drawings the valve comprises a valve section 10 and an actuator 11. The valve section 10 comprises a body 12 which is provided with a peripheral flange 13 which locates against the base wall of a recess 14 formed in a housing 15. The flange 13 of the body 12 is held against the base wall of the housing by an annular retaining member 15A which is screwed into the recess 14.

The valve body 12 defines an open ended blind bore 16 which adjacent its blind end defines a seating 17 which surrounds an outlet 18. Moreover, adjacent the seating there is defined an annular gallery 19 which by way of passages 20 and slots 21 formed in the body communicates with an inlet passage 22 formed in the housing 15.

Slidable in the bore 16 is a cup shaped valve member 24 the closed end of which is shaped for engagement with the seating 17.

The valve member is biased into engagement with the seating as will be explained, by a coiled compression spring 25 which engages the base wall of the valve member at one end and at its other end is located within a recess formed in the end portion of a valve actuating rod 26. The actuating rod is of stepped form with its end portion lying within the valve member being constructed as a sliding fit in the internal surface of the valve member and at its end remote from the valve member being provided with a screw thread. The valve actuating rod 26 carries a transversely extending pin 27 the end portions of which project into elongated slots 28 respectively which are formed in the wall of the valve member 24.

The retaining member 15A is provided with an internal step between which and the valve body is located a stop plate 31 which also acts to transmit the clamping force generated when the retaining member 15A is tightened within the recess 14.

The valve actuating rod 26 has a number of components mounted thereon the first of which adjacent the enlarged end portion of the rod which lies within the valve member, is a small washer 32 which extends with clearance through the central opening of the stop plate. Adjacent the washer is a reaction plate 33 and engaging the reaction plate is the end of a tubular extension of a spring abutment 34 which is engaged with the threaded portion of the actuating rod.

Engaging the outer peripheral portion of the reaction plate is an inturned flange 35 which is formed at the end of a tubular member 36 which is coupled to an armature forming part of the actuator 11. The actuator includes a stator which carries windings which are energised when as will be explained, it is required to lift the valve member from the seating.

A coiled compression spring 43 has one end engaging a tubular portion of the spring abutment 34 and its other end engaging a fixed abutment surface. Moreover, interposed between the spring abutment 34 and a pressure plate 44 which engages the inwardly extending flange 35 is a further coiled compression spring 45 which urges the flange into engagement with the reaction plate 33.

The extent of movement of the tubular member 36 and the armature when the windings of the actuator are energised, is limited by an annular stop member 47 which is engaged by an outwardly extending flange 46 on the tubular member 36. The stop member is held in position against the retaining member 15A by means (not shown) for example, the body of the actuator 11.

The various components of the valve are shown in the positions which they adopt when the windings are deenergised. It will be seen that the reaction plate 33 is in engagement with the stop plate 31 and that the valve member is in engagement with the seating. A small clearance exists between the pin 27 and the end walls of the slot 28 so that the valve member is held in engagement with the seating due to the force exerted by the spring 25 and also by the fluid pressure acting on at least the annular end of the skirt of the valve member.

When the winding is energised the force generated is transmitted to the valve actuating rod 26 through the spring 45 and the actuating rod will be lifted together with all the components which are secured thereto, against the action of the spring 43. The upward movement will eventually take up the small clearance which exists between the pin 27 and the end wall of the slot 28 and when this clearance has been taken up the valve member is moved upwardly away from the seating thereby allowing flow of fluid through the valve outlet 18. The movement of the valve member is halted by its engagement with the stop plate 31. This engagement will halt the movement of the actuating rod together with all the components connected thereto. However, continued movement of the annular member 36 and the armature can take place against the action of the spring 45, the eventual movement being halted by the engagement of the flange 46 with the stop member 47. The engagement of the flange with the stop member 47 leaves a small air gap between the faces of the armature and the stator of the actuator. Moreover, a gap will be established between the flange 35 and the reaction plate 33.

When the windings are de-energised, the spring 45 tends to move the annular member and the armature in the direction towards the seating and this movement assists the movement of the actuating rod under the action of the spring 43 towards the seating. During the movement of the actuating rod 26 the valve member 24 will engage the seating and continued movement of the actuating rod under the action of the spring 43 will take place at the same time compressing the spring 25, until the reaction plate 33 engages the stop plate 31. The inertia of the actuating rod 26 together with the components connected to it and also the annular member and the armature is absorbed by the engagement of the reaction plate 33 with the stop plate 31 and not by the engagement of the valve member with the seating. The life of the valve member and the seating is therefore extended as compared with constructions in which the engagement of the valve member with the seating halts the movement of the various components of the valve. Moreover, the small mass of the valve member substantially eliminates valve bounce which could otherwise take place without proper damping.

Turning now to FIG. 2 of the drawings the valve shown therein comprises a valve body 50 in which is formed a through bore 51. The bore defines a seating edge 52 adjacent which the bore is slightly enlarged, the enlargement being connected by a passage 53 to a fluid inlet 54. A port 55 opens into the bore at a position on the opposite side of the seating edge and the port communicates with a fluid outlet 56.

Slidable in the bore is a tubular valve member 57. The valve member is shaped to co-operate with the seating edge 52 and forms with the bore an annular chamber which is in communication with the port 55. The valve is shown in the open position in the drawing and upward movement of the valve member so that it engages the seating edge will prevent flow of fluid through the valve.

Extending within the bore in the valve member is an actuating rod 58 which at one end is secured within an armature 59 of an actuator 60. The armature is of cylindrical form and is slidable within a core tube surrounded by a winding 61. The actuator also includes a pole piece 62 located in one end of the core tube and a yoke 63 extending about the winding. When the winding is energised the armature and pole piece will assume opposite magnetic polarity thereby creating a force tending to move the armature upwardly. The extent of movement of the armature is limited by the engagement of a flange 64 on the armature with a stop face 65 defined on a mounting member 66 secured to the valve body.

The actuating rod 58 extends through the valve member and at its end is provided with a screw thread and engaged with the thread is a first spring abutment 67 between which and the valve member is a first coiled compression spring 68. Also mounted on the actuating rod is a flanged lock member 69. Located against the undersurface of the flange of the lock member is a shim 70 which is engaged by one end of a second coiled compression spring 71. The other end of the spring 71 is engaged with a second spring abutment 72 which is engagable with the end wall of the valve body 50. The spring abutment 72 has an inwardly directed flange 73 engaged on one side by the spring 71 and engagable on its other side by a flange at the adjacent end of the valve member. The abutment 72 has an outwardly directed flange 74 engaged by one end of a third coiled compression spring 75 the other end of which engages a shim positioned against a reaction surface formed on an annular member 76 adjustably mounted relative to the valve body 50. The open end of the annular member is closed by a plug.

In FIG. 2 the valve is shown in the open position with the winding 61 de-energised. When the winding is energised the armature 59 moves in the direction towards the pole piece 62 and the movement of the armature together with the actuating rod takes place against the action of the spring 71. The valve member 57 moves with the actuating rod 58 until it engages the seating 52 and continued movement of the actuating rod and armature takes place against the action of the spring 71 and also the spring 68 until the flange 64 engages the stop face 65. The impact loading of the valve member with the seating is therefore kept to minimum. When the winding 61 is de-energised the two springs 71 and 68 cause movement of the armature away from the pole piece 62 until the gap between the end of the armature and the valve member is taken up whereupon the valve member is lifted from the seating. The movement of the valve member away from the seating is rapid due to the velocity gained by the armature prior to lifting the valve member from the seating. The valve member 57 and the armature 59 move together under the action of the spring 71 until the flange on the valve member engages with the flange 73 of the spring abutment 72. The inertia of the armature and valve member is then absorbed by compression of the spring 75 during which time the valve member moves beyond the fully open position in which it is shown in the drawing. Finally the valve member and armature are returned to the position shown by the action of the spring 75.

We claim:

1. An electro-magnetically operable fluid control valve of the on/off type comprising:
   a seating;
   a valve member movable between open and closed positions relative to the seating;
   an electro-magnetic device including a stator assembly carrying a winding and an armature which is moved towards the stator assembly when the winding is energized;
   a return spring which is stressed during movement of the armature towards the stator assembly;
   means coupling the armature to the valve member, said means comprising an actuating element operatively connected to said return spring and a valve member undertravel spring interposed between said actuating element and the valve member, said undertravel spring yielding to allow continued movement of the actuating element when the valve member engages the seating;
   an armature overtravel spring interposed between the armature and said actuating element; and
   stop means operable to limit the movement of the valve member away from the seating when said winding is energized, the armature overtravel spring yielding to permit continued movement of the armature after said stop means has halted the movement of the valve member.

2. A fluid control valve according to claim 1, including further stop means acting to limit the movement of the actuating element under the action of the return spring when the winding is de-energised, said further stop means being positioned so that the valve member engages with the seating before the movement of the actuating element is halted by said further stop means.

3. A fluid control valve according to claim 2, in which said stop means and said further stop means are defined by a stop plate one face of which is engaged by the valve member and the other face of which is engaged by a reaction plate secured to the actuating element.

4. A fluid control valve according to claim 3, including a member coupled to the armature and defining an inturned flange located between said reaction member and one end of the armature over travel spring, the other end of the armature over travel spring being engaged with a spring abutment secured to the actuating element.

5. A fluid control valve according to claim 4, including a pin and slot connection between said actuating element and said valve member.

6. A fluid control valve according to claim 1, including a spring abutment mounted on said actuating element said valve member under travel spring being located between the valve member and said spring abutment, said return spring having one end engaging said spring abutment, and a stop surface defined on a part movable with the actuating element for limiting the relative movement of the valve member and the actuating element under the action of the under travel spring.

7. A fluid control valve according to claim 6, in which the other end of said return spring engages a further spring abutment which is biased by an over travel spring into engagement with a surface defined on a valve body, the further spring abutment being engageable by a flange on the valve member to define the normally open position of the valve member, and the further spring abutment being movable away from said surface against the action of the over travel spring when during the movement of the valve member away from the seat, the flange engages the further spring abutment.

8. A fluid control valve according to claim 7, in which said actuating element is secured to the armature.

* * * * *